H. VAN HOEVENBERG.
STEEPLECHASE PUZZLE.
APPLICATION FILED APR. 19, 1911.

1,013,522.

Patented Jan. 2, 1912.

WITNESSES

INVENTOR
Henry van Hoevenberg
BY
ATTORNEYS

UNITED STATES PATENT OFFICE.

HENRY VAN HOEVENBERG, OF LAKE PLACID, NEW YORK.

STEEPLECHASE-PUZZLE.

1,013,522.  Specification of Letters Patent.  Patented Jan. 2, 1912.

Application filed April 19, 1911. Serial No. 622,106.

*To all whom it may concern:*

Be it known that I, HENRY VAN HOEVENBERG, a citizen of the United States, and a resident of Lake Placid, in the county of Essex and State of New York, have invented a new and Improved Steeplechase-Puzzle, of which the following is a full, clear, and exact description.

This invention relates to a new and improved puzzle in which a member, representing a horse, is manipulated along a tortuous path through various apertures in a plate, representing a steeplechase course.

An object of this invention is to provide an apertured plate, which may be considered to represent a steeplechase course, with a horseshoe-shaped member, which may be considered to represent a horse and rider, the latter being normally separate from the plate, but adapted to be entered at a starting point and manipulated by a series of movements, which may be considered to embody the running of a horse over various stretches, varied at intervals by jumps from one aperture to another, which may represent the various jumps in a steeplechase course, and returning to the original starting point.

A further object of this invention is to provide an apertured plate with a variety of apertures of different sizes, and a movable member adapted to be traversed from a starting point to a predetermined point and returned, which is provided with a plurality of obstructions of different sizes, calculated to permit and prevent the proper passage of the member at predetermined points in the travel of the member from the start to the intermediate point and back again.

These and further objects, together with the construction and combination of parts, will be more fully described hereinafter and particularly set forth in the claims.

Reference is to be had to the accompanying drawings forming a part of this specification, in which similar characters of reference indicate corresponding parts in both the views, and in which—

Figure 1:
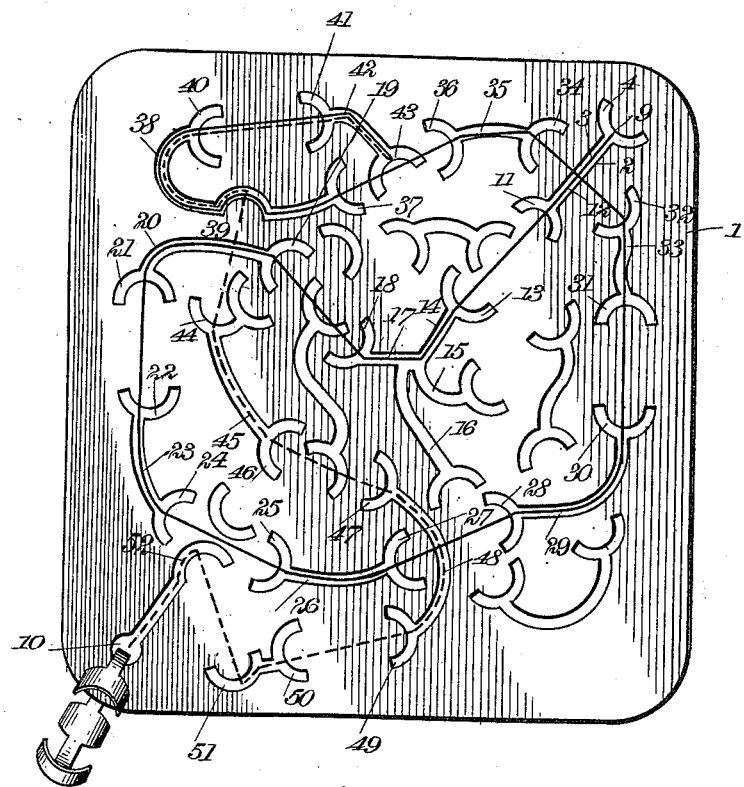
Figure 2:
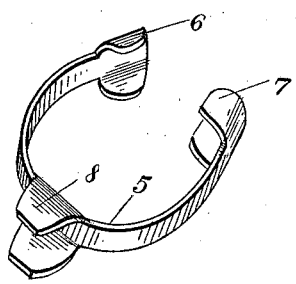

Figure 1 is a plan view, showing the apertured plate representing the steeplechase course; and Fig. 2 is a perspective view of the movable member representing the horse and rider.

Referring more particularly to the separate parts of this invention as embodied in the form shown in the drawings, 1 indicates a plate, which may be of any suitable material, such as sheet-metal, celluloid or the like, and which is provided with a plurality of apertures 2, which may be of any suitable character, but are preferably in the form of elongated stretches 3, representing straight runs in a steeplechase course, and jump slots 4 connected to the straight slots and representing the take-off places where the horse jumps over an interposed space of the course, which may represent an obstruction, such as a fence, brook or the like. These jump slots may be of any suitable predetermined character, such as an angular slot, but preferably an arcuate slot, as shown.

The member to be manipulated along a predetermined path on the plate 1, is indicated at 5, and may be considered to represent the horse and rider. While this member may be of any suitable form, it is shown as consisting of a horseshoe-shaped body portion having arcuate enlargements 6 and 7 at each end, which form the terminals of a gap formed in the member 5. The member 5, which we will call the horse, for short, is also provided with an enlargement 8, which is located intermediate the ends, preferably at the crown of the arch, and may be termed the saddle.

The enlargements 6 and 7, like the enlargement 8, are arcuate in form, to correspond to the arcuate slots in the plate 1, and these former members may be called the hoofs of the horse, for the purpose of distinction. A point to be noted in passing is that these enlargements, that is to say, the hoofs and the saddle, are all of different sizes. For example, the hoof 6 is the smallest, the hoof 7 next in size, and the saddle 8 largest of all. The purpose of this is to allow certain of the enlargements to pass through only certain of the arcuate slots, as will be hereinafter described.

The object of the puzzle is to start at the point marked 9 and proceed to the point marked 10, by various movements of the horse 5, and return to the starting point. The hoofs are so shaped with respect to the arcuate and other slots, that having once entered, the horse can not leave the plate except at the point 9, nor can he enter at any other point. With the horse or movable member detached from the plate, one of the hoofs 6 is inserted in the first arcuate slot 9, so that the member will pierce the plate, part of it projecting on each side of the plate. It will be found that, inasmuch as the slot 9 and the slot connected thereto 11, are smaller than any of the other slots, the hoof 6 must be the one inserted in the slot 9 in order to enter the plate at all. The purpose of this will appear hereinafter. The path which the horse must travel, in order to solve this puzzle, is traced by full and dotted lines in Fig. 1. Of course, the device could be manipulated along other paths, but they would not lead to success.

After the horse has been inserted in the plate, the connecting strip between the hoofs can be slid along the stretch represented by the slot 12, when the first jump occurs, with the arcuate slot 11 as the taking-off place and the arcuate slot 13 as the landing-point. Inasmuch as the hoof 6, which has been first inserted through the plate, is small, it will pass through the slot 11, which is also small. The arcuate slot 13, however, is of medium size, and will permit the other hoof 7, which is of medium size, to pass through, so that after the hoof 7 has entered into the slot 13, the hoof 6 can be removed from the slot 11. From this point, the horse might be slid into any one of a number of different stretches 14, 15 or 16. The majority of these, however, are blind, leading to various points of travel, which, however, would never bring the horse to the point 10, but by sliding the horse along the stretch 14 and then along a stretch 17, until the take-off place represented by the arcuate slot 18 is reached, the horse will be traveling in the right direction. From 18 the horse jumps to 19, runs along the stretch 20, and jumps from 21 to 22. Another stretch 23 connects 22 with 24, from whence the horse jumps to 25, and travels through a stretch 26 to a take-off arcuate slot 27, reaching an arcuate slot 28 by a jump. From 28, the horse runs along a stretch 29, jumping from 30 to 31, and arriving at a take-off place 32 through a stretch 33. From 32, a jump is made to 34, whence a straight run through a stretch 35 brings the horse to a take-off place 36, from whence he jumps to 37. Here, a tortuous path 38, which includes a take-off place 39, is traveled, jumping from 40 to 41, and running through a stretch 42 to a blind take-off in the form of an arcuate slot 43. At this point, the horse must back-track, that is to say, turn on his trail, as if he were following the fox and hounds, as if in fox-hunting, and in addition to back-tracking, the horse must reverse and pass from one side of the plate to the other. That is to say, during these various manipulations, the horse has remained on one side of the plate, but at this point, he must pass through the plate, and the manipulations take place on the opposite side thereof. For this purpose, the saddle 8 must be passed through the plate. Previous to this time, this operation was impossible, as none of the slots or arcuate slots were large enough to permit the saddle, which is the largest enlargement on the horse, to pass through. The arcuate slot 43, however, which marks the terminal or beginning of the back-track, is larger than any of the other arcuate slots representing the take-offs or landing points. It is evident that any one of the slots may be enlarged for this purpose, except 9 and 51.

When the horse has been shifted to the opposite side of the plate, then he is traveled back in the direction of the dotted lines, jumping from 41 to 40, sliding to 39, and jumping from 39 to 44. The run is made from 44 along a stretch 45 to a take-off 46, where a jump is made to 47. From 47, a run is made along a stretch 48 to a take-off 49, where another jump is taken to 50. A short run is made from 50 to 51, which may be termed the obstructing point in the travel, inasmuch as the arcuate slot 51, which represents the take-off, is of the smallest size; that is, of a size corresponding to the arcuate slots 9 and 11. It so happens that if the horse had come to this point, even along the path mentioned, without reversing from one side of the plate to the other at the terminal 43, the large hoof 7 would have entered the slot 50 from the jump from 49 to 50, and hence would be the next to pass through the plate, in taking the jump from 51 to the next landing place, indicated at 52, but, inasmuch as the hoof 7 would be too large for this purpose, the final jump on the outward run would be impossible. The reason, therefore, for changing from one side of the plate to the other is now apparent, inasmuch as this change will bring the smaller hoof 6 as the entering hoof in jumping from 49 to 51, so that the hoof will readily pass out of the slot 51 in the jump from 51 to 52. From 52, the horse is readily run to the mid point 10 of the travel. Any number of slots on the route indicated may be made smaller and larger, corresponding to 9, 11, 51 and 43, thus necessitating a number of changes from one side of the plate to the other, making the puzzle more difficult, if it is found desirable.

In going back, the operation is reversed, the path of travel being directly opposite to that of coming. The horse must pass through the plate at 43, as before, so as to present the smaller hoof to the slot 11, thereby permitting the horse to be bodily removed from the plate by having the hoof 6 come out at the slot 9.

It will thus be seen that there is provided a puzzle which will require considerable study and manipulation, to say nothing of skill, to accomplish the desired purpose, and yet which, when the key is once discovered, will permit an average person to run the horse from the start to the intermediate point and back again, in an interesting and successful manner.

While I have shown one embodiment of my invention, I do not wish to be limited to the specific details thereof, but desire to be protected in various changes, alterations and modifications which may come within the scope of the appended claims.

Having thus described my invention, I claim as new and desire to secure by Letters Patent:—

1. In a puzzle, the combination with an apertured plate, of a detachable member adapted to be passed along said plate by inserting a portion thereof through the apertures in said plate, and manipulating said member from point to point, said member having a plurality of enlargements of different sizes, and said plate having a plurality of its apertures of different sizes to correspond with the size of said enlargements on said member.

2. In a puzzle, the combination with a plate, having a plurality of slots connected to other slots, and a member, having a plurality of enlargements adapted to be inserted in said last-mentioned slots, said enlargements corresponding in form to said last-mentioned slots, and some of said last-mentioned slots being of different magnitude from others of said last-mentioned slots, and said enlargements being of different magnitudes, to correspond to said last-mentioned slots.

3. In a puzzle, the combination with an apertured plate, of a horseshoe-shaped member adapted to be passed through the apertures in said plate along a predetermined path, said member having ends spaced apart to form a gap, with enlargements formed on said ends, said enlargements conforming in contour to some of the apertures in said plate.

4. In a puzzle, the combination with an apertured plate, of a horseshoe-shaped member adapted to be passed through the apertures in said plate along a predetermined path, said member having ends spaced apart to form a gap, with enlargements formed on said ends, said enlargements conforming in contour to some of the apertures in said plate, some of said apertures being of different magnitudes, and said enlargements being of different magnitudes to correspond to the magnitudes of said apertures.

5. In a puzzle, the combination with a plate having a plurality of slots therein, said slots being spaced apart from each other and terminating in other slots, and a member adapted to be inserted through said slots and having enlargements thereon corresponding in form to said second-mentioned slots, said member being adapted to traverse said slots and bridge the break between opposed pairs of said second-mentioned slots.

6. In a puzzle, the combination with a plate having a plurality of slots therein, of a member adapted to be entered into said slots and manipulated from one to the other along a predetermined path of travel, the entering slot or starting slot being of smaller magnitude than the majority of said slots, said member having enlargements thereon of different sizes, whereby only one of said enlargements can enter at the entering or starting slot, and another of said slots being of a smaller size, corresponding to the entering slot, whereby the larger of said enlargements can be passed therethrough, the arrangement of slots in between said entering slot and said last-mentioned slot being of such a nature that the large slot would normally be presented for passage through said last-mentioned slot.

7. In a puzzle, the combination with a plate having a plurality of slots therein, of a member adapted to be entered into said slots and manipulated from one to the other along a predetermined path of travel, the entering slot or starting slot being of smaller magnitude than the majority of said slots, said member having enlargements thereon of different sizes, whereby only one of said enlargements can enter at the entering or starting slot, and another of said slots being of a smaller size, corresponding to the entering slot, whereby the larger of said enlargements can be passed therethrough, the arrangement of slots in between said entering slot and said last-mentioned slot being of such a nature that the large slot would normally be presented for passage through said last-mentioned slot, said member having another enlargement thereon of greater magnitude than either of said first-mentioned enlargements, and said plate having a reversal point formed by a slot of greater magnitude than any of the other slots, whereby said member can be reversed from one side of the plate to the other by the passage of said last-mentioned enlargement through said slot of greatest magnitude, so as to reverse the direction of manipulation of said member, whereby said member will present the enlargement of smallest magnitude on said member for passage through said last-mentioned slot of small magnitude.

8. In a puzzle, the combination with a plate having a plurality of elongated slots and arcuate slots, of a member, arcuate in form and having a plurality of arcuate enlargements corresponding to said arcuate slots, said member being adapted to be traversed on said plate by passing said enlargements through said arcuate slots and sliding the body of said member through said elongated slots.

9. In a puzzle, the combination with a plate having a plurality of elongated slots and arcuate slots, of a member, arcuate in form and having a plurality of arcuate enlargements corresponding to said arcuate slots, said member being adapted to be traversed on said plate by passing said enlargements through said arcuate slots and sliding the body of said member through said elongated slots, some of said slots being of greater magnitude than others of said slots, said enlargements being of different magnitudes, to correspond to the different magnitudes of said arcuate slots.

10. In a puzzle, the combination with a plate having a plurality of apertures therein, of a member separate from said plate, adapted to be passed through the apertures in said plate and manipulated from point to point of said plate, said member having obstructions thereon, said apertures and said obstructions being of such form and magnitude that said member can enter said plate at a single point only and after once entering said plate, cannot be removed from said plate except at said last-mentioned point.

11. In a puzzle, the combination with a plate having a plurality of apertures therein, of a member separate from said plate, adapted to be passed through the apertures in said plate and manipulated from point to point in said plate, said member having obstructions thereon, said apertures and said obstructions being of such form and magnitude that said member can enter said plate at a single point only, and after once entering said plate, cannot be removed from said plate except at said last-mentioned point, said plate having an object point located by an aperture, to which said member to be manipulated from said first-mentioned point to said object point, whereat said member must be reversed from one side of said plate to the other, to permit the attainment of said object point.

12. In a puzzle, the combination with a plate having a plurality of slots spaced apart in pairs and connected together two or more in a series by elongated slots, and a member having enlargements corresponding to said first-mentioned slots, adapted to be manipulated through said slots from point to point.

In testimony whereof I have signed my name to this specification in the presence of two subscribing witnesses.

HENRY van HOEVENBERG.

Witnesses:
H. WHITING,
PHILIP D. ROLLHAUS.

---

Copies of this patent may be obtained for five cents each, by addressing the "Commissioner of Patents Washington, D. C."